United States Patent
Huang et al.

(10) Patent No.: US 11,440,183 B2
(45) Date of Patent: Sep. 13, 2022

(54) HYBRID MACHINE LEARNING-BASED SYSTEMS AND METHODS FOR TRAINING AN OBJECT PICKING ROBOT WITH REAL AND SIMULATED PERFORMANCE DATA

(71) Applicant: ABB Schweiz AG, Baden (CH)

(72) Inventors: Jinmiao Huang, Chongqing (CN); Carlos Martinez, South Windsor, CT (US); Sangeun Choi, Simsbury, CT (US); Thomas A. Fuhlbrigge, Ellington, CT (US)

(73) Assignee: ABB Schweiz AG, Baden (CH)

( * ) Notice: Subject to any disclaimer, the term of this patent is extended or adjusted under 35 U.S.C. 154(b) by 774 days.

(21) Appl. No.: 16/366,700

(22) Filed: Mar. 27, 2019

(65) Prior Publication Data

US 2020/0306959 A1    Oct. 1, 2020

(51) Int. Cl.
*B25J 9/16* (2006.01)
*G06N 20/00* (2019.01)
*G06F 17/18* (2006.01)

(52) U.S. Cl.
CPC ............ *B25J 9/163* (2013.01); *B25J 9/1612* (2013.01); *B25J 9/1671* (2013.01); *G06F 17/18* (2013.01); *G06N 20/00* (2019.01)

(58) Field of Classification Search
USPC ................................................ 700/245–264
See application file for complete search history.

(56) References Cited

U.S. PATENT DOCUMENTS

| | | | | |
|---|---|---|---|---|
| 6,281,465 B1 * | 8/2001 | Muller | .................. | B23K 11/115 219/109 |
| 7,844,398 B2 * | 11/2010 | Sato | ..................... | B25J 9/1666 700/214 |
| 9,321,176 B1 * | 4/2016 | Sun | ....................... | B25J 9/1612 |
| 9,333,649 B1 * | 5/2016 | Bradski | ................ | G06V 10/60 |
| 9,649,764 B1 * | 5/2017 | Sun | ....................... | B25J 13/025 |
| 9,669,543 B1 * | 6/2017 | Stubbs | .................. | B25J 9/1612 |
| 9,694,494 B1 * | 7/2017 | Stubbs | .................. | B25J 9/1612 |
| 10,089,575 B1 * | 10/2018 | Redmon | ................ | G06N 3/08 |

(Continued)

OTHER PUBLICATIONS

Kraft et al. "Automatic Grasp Generation and Improvement for Industrial Bin-Picking," Gearing Up and Accelerating Cross-fertilization between Academic and Industrial Robotics Research in Europe, Springer, Cham, 155-176 (Jan. 1, 2014) (Year: 2014).*

(Continued)

*Primary Examiner* — Jonathan L Sample
(74) *Attorney, Agent, or Firm* — Leydig, Voit & Mayer, Ltd.

(57) ABSTRACT

For training an object picking robot with real and simulated grasp performance data, grasp locations on an object are assigned based on object physical properties. A simulation experiment for robot grasping is performed using a first set of assigned locations. Based on simulation data from the simulation, a simulated object grasp quality of the robot is evaluated for each of the assigned locations. A first set of candidate grasp locations on the object is determined based on data representative of simulated grasp quality from the evaluation. Based on sensor data from an actual experiment for the robot grasping using each of the candidate grasp locations, an actual object grasp quality is evaluated for each of the candidate locations.

19 Claims, 7 Drawing Sheets

(56) References Cited

U.S. PATENT DOCUMENTS

| | | | | |
|---|---|---|---|---|
| 10,275,543 | B1* | 4/2019 | Edsinger | G06F 30/17 |
| 10,773,382 | B2* | 9/2020 | Bai | B25J 9/1612 |
| 10,899,011 | B2* | 1/2021 | Toris | B25J 9/1661 |
| 10,919,151 | B1* | 2/2021 | Marchese | B65G 1/1373 |
| 10,981,272 | B1* | 4/2021 | Nagarajan | B25J 9/1669 |
| 11,185,978 | B2* | 11/2021 | Jamali | B25J 9/163 |
| 2009/0306825 | A1* | 12/2009 | Li | B25J 9/1669 700/261 |
| 2013/0184870 | A1* | 7/2013 | Ota | B25J 9/1669 700/262 |
| 2014/0163731 | A1* | 6/2014 | Shi | B25J 9/1612 700/250 |
| 2016/0136807 | A1* | 5/2016 | Scheurer | B25J 9/1612 700/250 |
| 2016/0167228 | A1* | 6/2016 | Wellman | B25J 9/1602 901/3 |
| 2019/0126471 | A1* | 5/2019 | Kobayashi | B25J 9/1612 |
| 2019/0176326 | A1* | 6/2019 | Bingham | B25J 9/161 |
| 2020/0301500 | A1* | 9/2020 | Wilde | G06F 3/011 |

OTHER PUBLICATIONS

Levine et al., "Learning Hand-Eye Coordination for Robotic Grasping with Deep Learning and Large-Scale Data Collection," arXiv preprint arXiv:1603.02199, 12 pp. (2016).

Mahler et al., "Dex-Net 2.0: Deep Learning to Plan Robust Grasps with Synthetic Point Clouds and Analytic Grasp Metrics," arXiv preprint arXiv:1703.09312, 12 pp. (2017).

Pinto et al., "Supersizing Self-supervision: Learning to Grasp from 50K Tries and 700 Robot Hours," *2016 IEEE International Conference on Robotics and Automation (ICRA)*, IEEE, 8 pp. (2016).

Preferred Networks, Inc., "Bin-picking Robot Deep Learning," YouTube video downloaded from the Internet at https://www.youtube.com/watch?v=ydh_AdWZflA on Dec. 26, 2018, 2 pp. (Dec. 15, 2015).

Redmon et al., "Real-Time Grasp Detection Using Convolutional Neural Networks," Robotics and Automation (ICRA), *2015 IEEE International Conference (ICRA)*, IEEE, 7 pp. (2015).

Kraft et al. "Automatic Grasp Generation and Improvement for Industrial Bin-Picking," *Gearing Up and Accelerating Cross-fertilization between Academic and Industrial Robotics Research in Europe*, Springer, Cham, 155-176 (Jan. 1, 2014).

Ellekilde et al., "Applying a Learning Framework for Improving Success Rates in Industrial Bin Picking," *2012 IEEE/RSJ International Conference on Intelligent Robots and Systems*, IEEE, (Oct. 7, 2012).

KUKA, "KUKA Robot Group Specification KR 4 sixx R650, R850 Specification," product brochure downloaded from the Internet at https://www.tracepartsonline.net/PartsDefs/Production/KUKA PDF/10-03032009-080852/documents/KUKA_KR5sixx_Spezifikation_en.pdf on Jun. 5, 2020, 55 pp. (Jan. 1, 2007).

European Patent Office, International Search Report in International Patent Application No. PCT/IB2020/052757, 6 pp. (dated Jul. 13, 2020).

European Patent Office, Written Opinion in International Patent Application No. PCT/IB2020/052757, 14 pp. (dated Jul. 13, 2020).

* cited by examiner

HYBRID MACHINE LEARNING-BASED SYSTEMS AND METHODS FOR TRAINING AN OBJECT PICKING ROBOT WITH REAL AND SIMULATED PERFORMANCE DATA

TECHNICAL FIELD

The present disclosure relates to robotic grasping of objects, and, more particularly, to systems and methods for machine learning-based training of object picking robots.

BACKGROUND

In at least some known systems and methods for machine learning-based robot training, limited data sources are utilized, which may reduce the efficiency, speed, and accuracy of resultant machine learning models. Known systems and methods may only utilize data from real-world robot picking experiments. Likewise, known robot training systems and methods may utilize only synthetic data generated in virtual environments based on object physical properties. In any event, a lack of cooperative utilization of numerous sources of robot grasping performance data from actual and simulated experiments and in both training and run time machine learning environments may lead to lost opportunities for efficiency gains for object picking robot training and for the various industrial processes for which such systems are applied.

SUMMARY

The systems and methods for hybrid machine learning (ML)-based training of object picking robots with real and simulated grasp performance data disclosed herein present a new and improved processing pipeline for solving robot picking problems. A hybrid machine learning engine is used to train the robot to learn the grasp location in both simulated and real-world environments. A sensor feedback system fuses multiple sensor signals to evaluate the grasp quality. The disclosed systems and methods are further capable of run time/in-line self-correction and fine-tuning the robot grasp by online learning.

In one aspect, a method for training an object picking robot with real and simulated grasp performance data is provided. The method includes assigning a plurality of grasp locations on an object based on known or estimated physical properties of the object. The method includes performing a first simulation experiment for the robot grasping the object using a first set of the plurality of assigned grasp locations. The method includes evaluating, based on a first set of simulation data from the first simulation experiment, a simulated object grasp quality of the robot grasping for each of the first set of assigned grasp locations. The method includes determining a first set of candidate grasp locations on the object based on data representative of a simulated grasp quality obtained in the evaluating step for the simulated object grasp quality. The method includes evaluating, based on a first set of grasp quality sensor data from a first actual experiment for the robot grasping the object using each of the first set of candidate grasp locations, an actual object grasp quality of the robot grasping for the each of the first set of candidate grasp locations. The method includes, for the each of the first set of candidate grasp locations, determining a convergence of the actual object grasp quality and the simulated object grasp quality based on: the first set of grasp quality sensor data from the first actual experiment, and the data representative of the simulated grasp quality.

In another aspect, a system for training an object picking robot with real and simulated grasp performance data is provided. The system includes one or more memory devices, and one or more processors in communication with the one or more memory devices and the object picking robot. The one or more processors are programmed to assign a plurality of grasp locations on an object based on known or estimated physical properties of the object. The one or more processors are programmed to perform a first simulation experiment for the robot grasping the object using a first set of the plurality of assigned grasp locations. The one or more processors are programmed to evaluate, based on a first set of simulation data from the first simulation experiment, a simulated object grasp quality of the robot grasping for each of the first set of assigned grasp locations. The one or more processors are programmed to determine a first set of candidate grasp locations on the object based on data representative of a simulated grasp quality obtained in evaluating the simulated grasp quality. The one or more processors are programmed to evaluate, based on a first set of sensor data from a first actual experiment for the robot grasping the object using each of the first set of candidate grasp locations, an actual object grasp quality of the robot grasping for the each of the first set of candidate grasp locations.

In yet another aspect, a non-transitory computer-readable storage medium storing processor-executable instructions for training an object picking robot with real and simulated grasp performance data is provided. When executed by one or more processors, the processor-executable instructions cause the one or more processors to: (a) assign a plurality of grasp locations on an object based on known or estimated physical properties of the object; (b) perform a first simulation experiment for the robot grasping the object using a first set of the plurality of assigned grasp locations; (c) evaluate, based on a first set of simulation data from the first simulation experiment, a simulated object grasp quality of the robot grasping for each of the first set of assigned grasp locations; (d) determine a first set of candidate grasp locations on the object based on data representative of a simulated grasp quality obtained in in evaluating the simulated grasp quality; and (e) evaluate, based on a first set of grasp quality sensor data from the first actual experiment, an actual object grasp quality of the robot grasping for the each of the first set of candidate grasp locations.

The systems and methods for hybrid ML-based training of object picking robots with real and simulated grasp performance data disclosed herein provides users a number of beneficial technical effects and realizes various advantages as compared to known systems and methods. Such benefits include, without limitation, enabling picking and placing of object(s) with enhanced accuracy, speed, efficiency, and reduced error rates as compared to known processes. Utilizing the disclosed systems and methods for hybrid ML-based training of object picking robots thereby results in a reduction in the required number of per object CPU clock cycles needed for processor(s) in both training and run time environments. The systems and methods for hybrid ML-based training of object picking robots described herein enable continuous evaluation and monitoring of object grasping performance so that the hybrid ML operations may be implemented for fine-tuning and enhancing the accuracy and robustness of ML models, as needed, including across numerous robots involved in unit operations. As such, the disclosed systems and methods for hybrid ML-based training of object picking robots enable efficient and effective training of object picking robots in a wide variety of industrial applications where improved utilization of computing, memory, network bandwidth, electric power, and/or human personnel resources is desirable.

Further and alternative aspects and features of the disclosed principles will be appreciated from the following detailed description and the accompanying drawings. As will be appreciated, the principles related to the disclosed systems and methods for hybrid machine learning-based training of object picking robots with real and simulated grasp performance data are capable of being carried out in other and different embodiments, and capable of being modified in various respects. Accordingly, it is to be understood that both the foregoing summary and the following detailed description are exemplary and explanatory only and do not restrict the scope of the appended claims.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
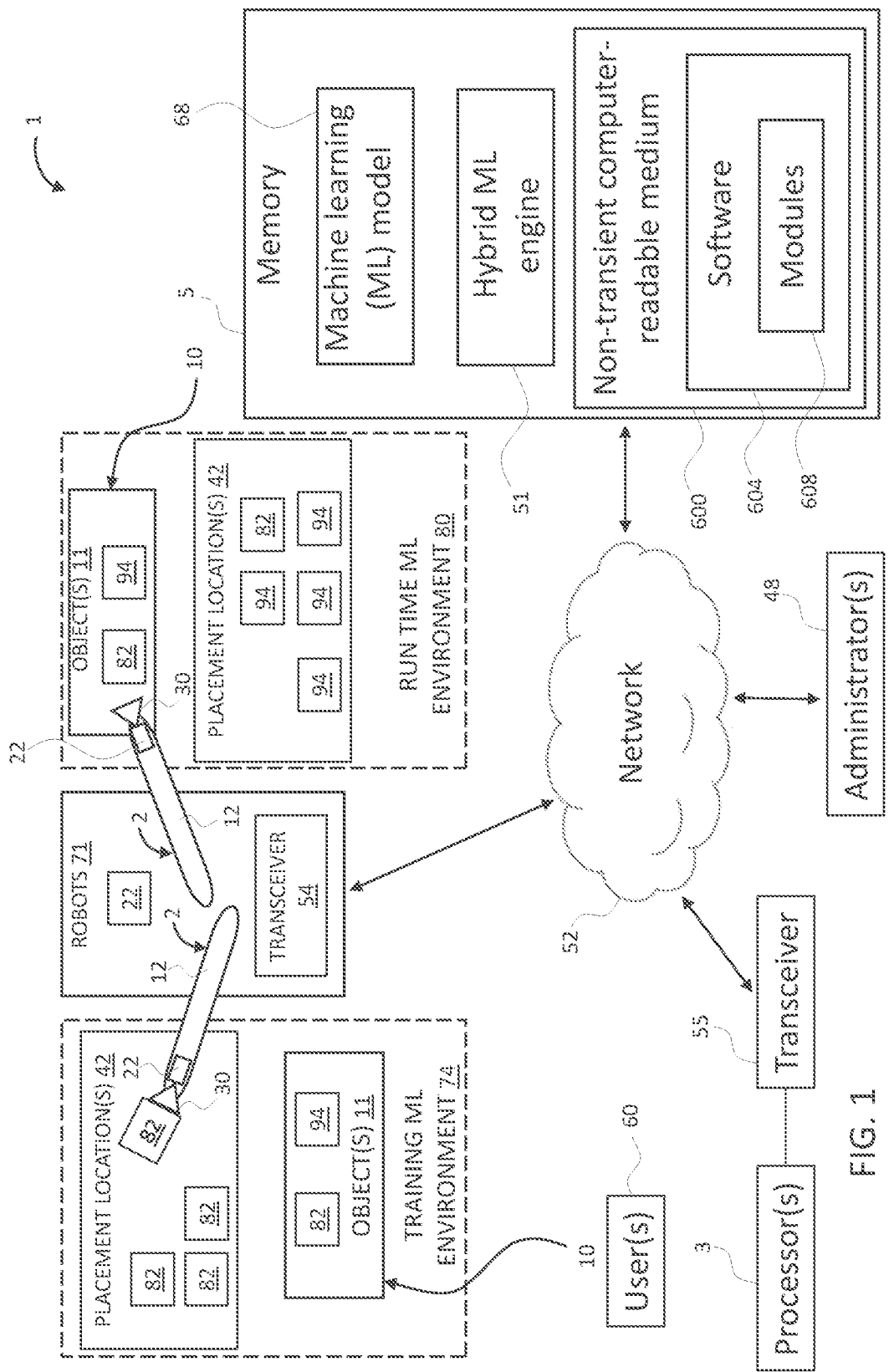
FIG. 1 is a schematic diagram of a system for hybrid machine learning-based training of object picking robots with real and simulated grasp performance data according to an embodiment of the disclosure.
Figure 2:
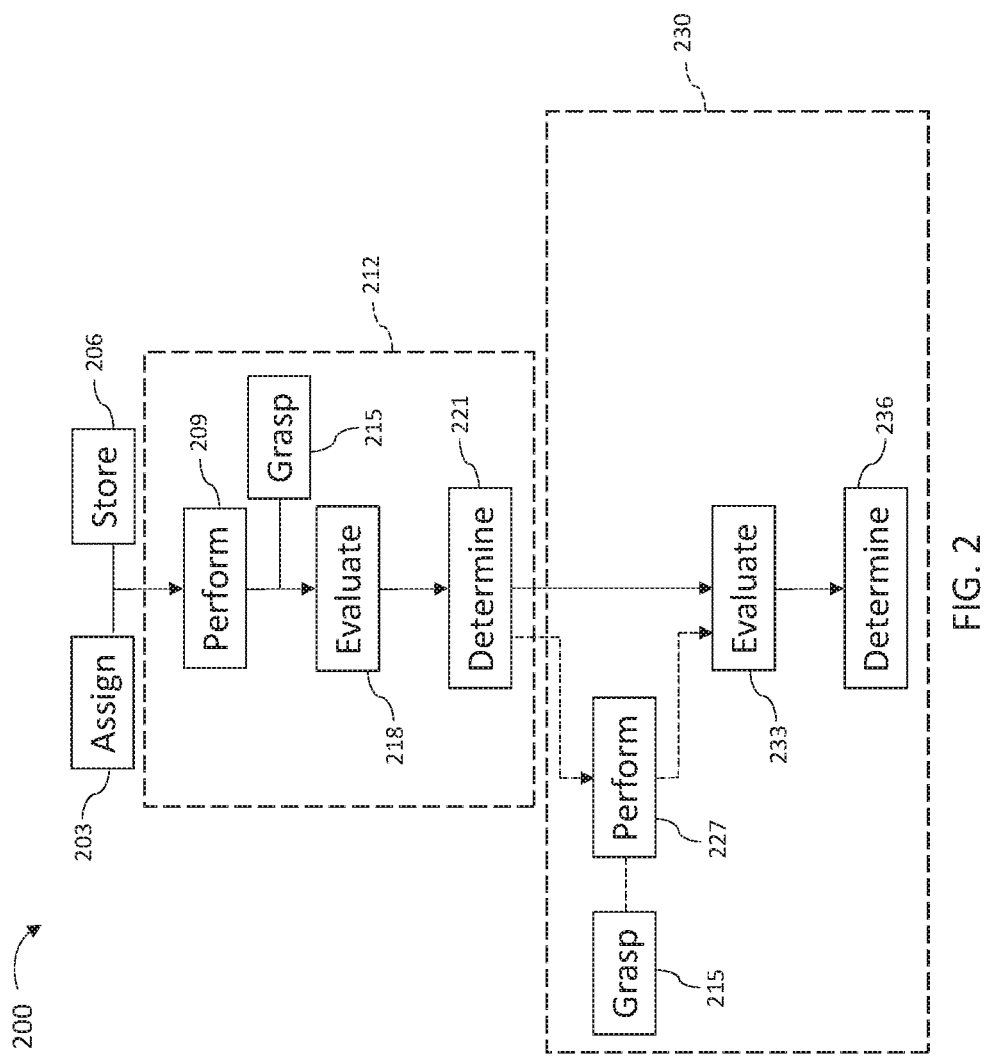
FIG. 2 is a flow chart of a method for hybrid machine learning-based training of object picking robots with real and simulated grasp performance data using the system shown in FIG. 1 according to an embodiment of the disclosure.

FIG. 1 is a schematic diagram of a system (1) for hybrid machine learning (ML)-based training of object picking robots (2) with real and simulated grasp performance data according to an embodiment of the disclosure. FIG. 2 is a flow chart of a method (200) for hybrid ML-based training of object picking robots (2) with real and simulated grasp performance data according to an embodiment of the disclosure. In the illustrated examples, the method (200) shown in FIG. 2 is implemented, at least in part, using the system (1) of FIG. 1.

Referring to FIG. 1, system (1) includes one or more memory devices (5), also collectively referred to herein as memory (5). Memory (5) includes an ML model (68) stored therein. ML model (68) may be stored in memory (5), at least in part, as a database. System (1) includes one or more processors (3) in communication with memory (5). System (1) includes an object picking robot (2) including at least one robotic arm (12) in communication with processor(s) (3). Object picking robot (2) is also collectively referred to herein as robot (2). Processor(s) (3) include at least one transceiver (55) in communication with one or more transceivers (54) of robot (2). In an example, memory (5) is also in communication with robot (2). Robot (2) includes at least one object gripper device (30) operably coupled to robotic arm(s) (12). Gripper device(s) (30) is/are in communication with processor(s) (3). In the embodiment shown in FIG. 1, system (1) includes a plurality of robots (71). As used herein, "operably coupled" refers to two or more functionally-related components being coupled to one another for purposes of cooperative mechanical movement(s) and/or for purposes of flow of electric current and/or flow of data signals. Where this operative coupling of two or more components is for purposes of data flow, the two or more components may be operably coupled via a wired connection and/or via a wireless connection. The two or more components that are so coupled via the wired and/or wireless connection(s) may be proximate one another (e.g., a first component being in the same room or in the same component housing as a second component) or they may be separated by some distance in physical space (e.g., the first component being in a different building from the location of the second component).

System (1) includes one or more sensors (22) in communication with processor(s) (3). Sensor(s) (22) is/are positioned on and/or in robotic arm(s) (12) and/or gripper(s) (30) and operably coupled thereto. Sensor(s) (22) may be positioned and/or mounted on a structural frame of the robot (2) (e.g., stationary cameras affixed to a robot cell, a booth, and/or a safety cage, not shown in FIG. 1), either instead of, or in addition to, being positioned on and/or in robotic arm(s) (12) and/or gripper(s) (30). In an example, sensor(s) (22) is/are, or include, grasp quality sensor(s) (22). Grasp quality sensor(s) (22) is/are also collectively referred to herein as sensor(s) (22). Sensor(s) (22) include one or more of: multi-degree of freedom (DOF) force-torque sensor(s), camera(s) for monitoring and collecting visual data during robotic manipulation tasks such as grasping of object(s) (11), multi-DOF inertial measurement sensor(s) for measuring dynamic aspects of robotic object (11) handling, and directional and/or rotational motion sensor(s) (e.g., motor encoder(s), camera(s), and/or tactile sensor(s)) for monitoring and/or detecting relative motion between the object (11) and the gripper (30). In an example, multi-DOF force-torque sensor(s) and/or multi-DOF inertial measurement sensor(s) are mounted and/or otherwise operably coupled to and/or between the robotic arm(s) (12) and the gripper(s) (30) for measuring a static and/or dynamic status of object(s) (11) with respect to the gripper(s) (30) and a grasp location on the object(s) (11). Likewise, in the example, sensor(s) (22) may include fixed (to ground) grasp quality sensor(s) to facilitate the measurement of static and/or dynamic status of object(s) (11).

System (1) includes a training ML environment (74) and a run time ML environment (80) for robot (2). Training (74)

and run time (134) ML environments include at least one picking location (10) and at least one placement location (42). In an example, training ML (74) and/or run time ML (80) environments is/are simulated computing and robot (2) manipulation environment(s). In another example, training (74) and/or run time (80) ML environments is/are actual (e.g., "real world") computing and robot (2) manipulation environment(s). In yet another example, training ML (74) and/or run time (80) ML environments is/are both simulated and actual computing and robot (2) manipulation environment(s). One or more objects (11) are delivered to and/or otherwise arrive at picking location(s) (10) for simulated and/or actual manipulation by system (1) including robot(s) (2). In the embodiment shown in FIG. 1, a plurality of object(s) (11) (e.g., a first object (82) and at least a second object (94)) are present in training (74) and/or run time (80) ML environment(s), with each of the first (82) and the at least a second (94) objects having a plurality of physical characteristics such as a shape, material(s) of construction, a weight, a density, a center of mass, a mass distribution, a height, a width, and/or a length. The plurality of object (11) physical characteristics may additionally include an object (11) identification and images depicting the appearance(s) of object(s) (11) in various poses.

Processor(s) (3) may be located in training (74) and/or run time (80) ML environment(s). Processor(s) (3) may be located remote from training (74) and/or run time (80) ML environment(s). Processor(s) (3) may be collocated with robot (2). Processor(s) (3) are programmed to implement and/or otherwise perform, at least in part, one or more of the disclosed steps of method (200) (shown in FIG. 2), including, without limitation, using system (1). Processor(s) (3) are capable of carrying out multiple functions in system (1). Processor(s) (3) include robotic arm (12) control functionality and gripper (30) control functionality. Processor(s) (3) include ML functionality. In an example, ML functionality of processor(s) (3) is implemented and/or otherwise performed, at least in part, in system (1) using one or more artificial intelligence and/or deep learning computing and processing scheme(s).

In an example, memory device(s) (5) include at least one non-transient computer-readable medium (600). Non-transient computer-readable medium (600) stores as software (604) processor (3)-executable instructions for training robot(s) (2) with real (e.g., actual, "real-world") and simulated grasp performance data, including, without limitation, in system (1). In an example, processor (3)-executable instructions stored as software (604) include one or more software modules (608). When executed by the processor(s) (3) that are in communication with memory (5), robotic arm(s) (12), gripper(s) (30), and sensor(s) (22), the processor (3)-executable instructions cause the processor(s) (3) to implement and/or otherwise perform, at least in part, one or more of the disclosed steps of method (200), including, without limitation, using system (1).

In system (1), processor(s) (3), memory (5), robotic arm(s) (12), gripper(s) (30), and sensor(s) (22) are in communication with one another via, and communicate with one another using signals (e.g., encoded data signals) sent and/or received through, a network (52). Communication among and between processor(s) (3), memory (5), robotic arm(s) (12), gripper(s) (30), and sensor(s) (22) is facilitated by transceivers (54, 55). In an example, system (1) communication using network (52) includes wireless communication equipment and protocols. In another example, system (1) communication using network (52) includes wired communication equipment and protocols. In yet another example, system (1) communication using network (52) includes a combination of wireless and wired communication equipment and protocols. In an example, system (1) communication includes wireless and/or wired communication equipment and protocols for utilizing cloud-based processing, data storage, and/or communication resources. In an example, system (1) communication utilizes the Internet, including, without limitation, Internet of Things (IoT) protocols, practices, and/or standards.

Figure 3:
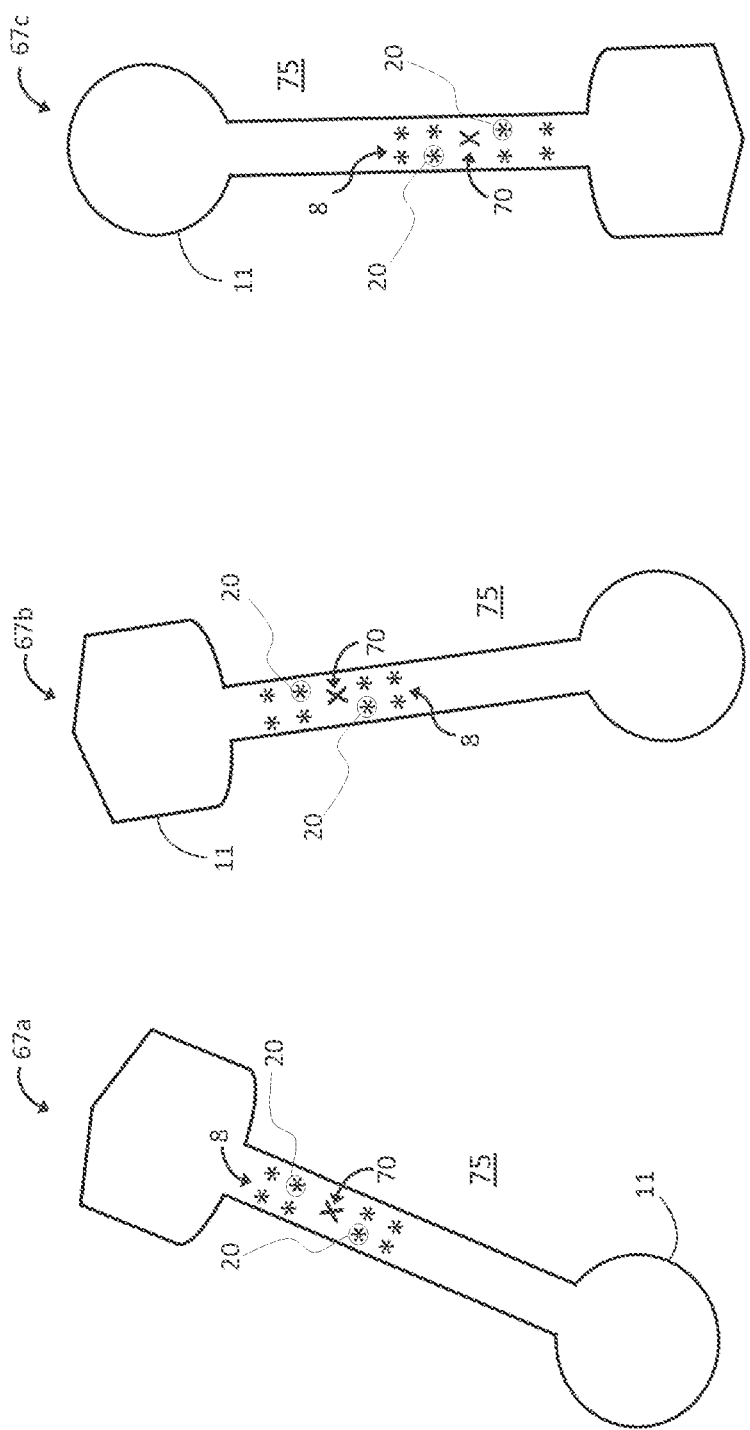
FIG. 3 is a schematic diagram of an object positioned in a simulated or an actual workspace of a robot of the system shown in FIG. 1 according to an embodiment of the disclosure.
Figure 4:
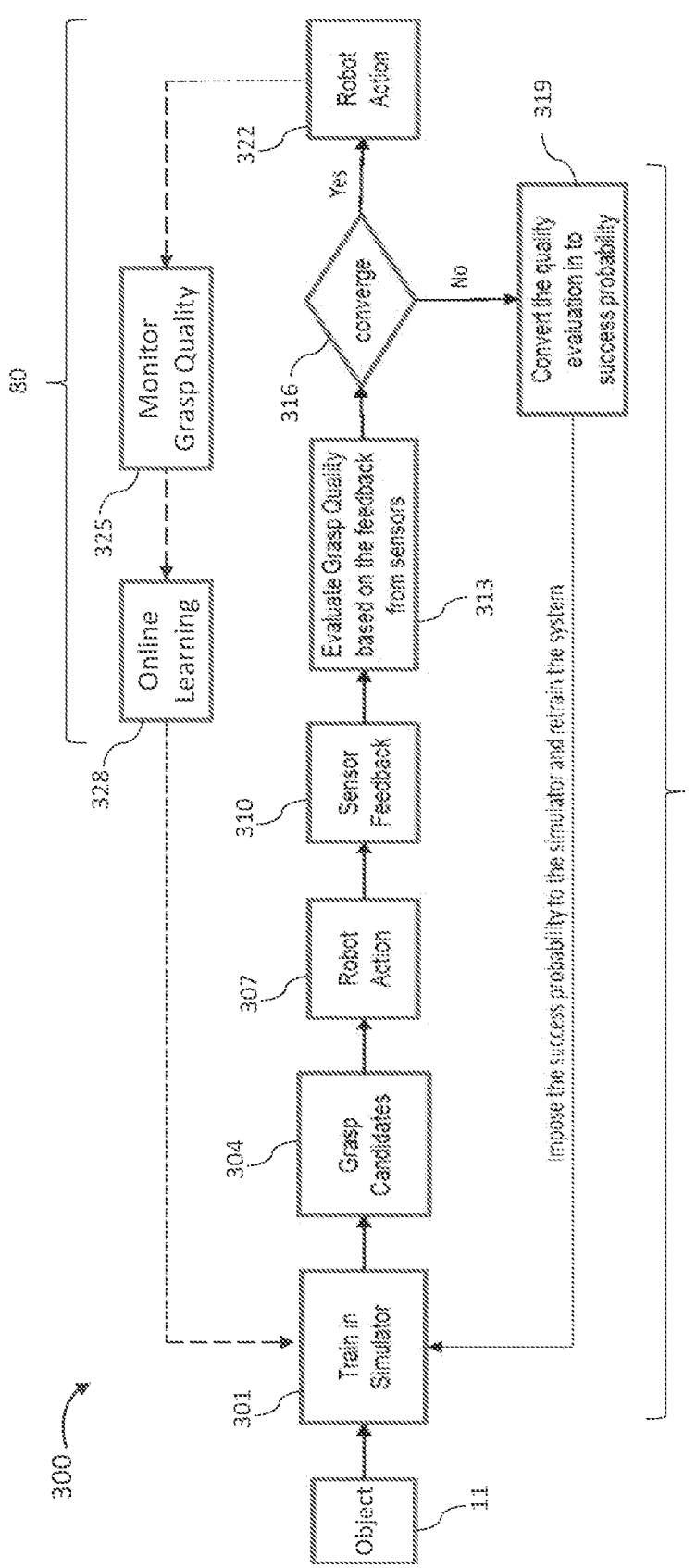
FIG. 4 is a schematic diagram of a process for hybrid machine learning-based training of object picking robots with real and simulated grasp performance data using the system shown in FIG. 1 and the method shown in FIG. 2 according to an embodiment of the disclosure.

FIG. 3 is a schematic diagram of object (11) positioned in a plurality of poses (67) in a simulated or an actual workspace (75) of the robot (2) of the system (1) shown in FIG. 1 according to an embodiment of the disclosure. FIG. 4 is a schematic diagram of a process (300) for hybrid ML-based training of robot (2) with real and simulated grasp performance data using system (1) and method (200) according to an embodiment of the disclosure.

Referring to FIG. 3, the object (11) has known or estimated physical properties (6) including a center of mass (COM) (70) (e.g., denoted by "x" in FIG. 3). COM (70) may be known, or its location may be assigned to object (11) based on other known or estimated physical properties (6) such as mass, dimensions, material, and distribution of the mass over the volume of the object (11). As further described herein, a plurality of grasp locations (8) (e.g., eight locations, denoted by asterisks "*" in FIG. 3) are assigned on the object (11). The object may be present in the training (74) and/or the run time (80) ML environments in a plurality of different poses (e.g., first (67a), second (67b), and third (67c) poses). In the embodiment, the assigned grasp locations (8) on the object (11) do not vary depending on the particular pose(s) (67) in which the object (11) in encountered by system (1). As described herein, the disclosed system (1) and method (200) includes determining candidate grasp locations (20) from among the plurality of assigned grasp locations (8). In the example shown in FIG. 3, two of the eight assigned grasp locations (8) are determined as candidate grasp locations (20) (e.g., denoted by circled asterisks in FIG. 3).

Referring to FIGS. 1-4, process (300) is used for hybrid ML-based training of robot(s) (2) performing for picking of a particular object (11). In an example, object (11) may be a family of objects (11) having the same or similar physical properties (6). Process (300) may be implemented for robot (s) (2) separately for unique objects (11) having dissimilar physical properties (6). In the embodiment, process (300) commences with block (301). In block (301), process (300) trains the robot (2) in a simulator. From block (301), process (300) proceeds to a block (304). In block (304), process (300) determines candidate grasp locations (20) from among the plurality of assigned grasp locations (8). From block (304), process (300) proceeds to a block (307). In block (307), a simulation and actual experiments for robot (2) are performed using the determined candidate grasp locations (20) on the object (10).

From block (307), process (300) proceeds to a block (310). In block (310), process (300) obtains data from grasp quality sensor(s) (22) for feedback with respect to grasp performance of the robot (2) grasping the object (11). From block (310), process (300) proceeds to a block (313). In block (313), process (300) evaluates the grasp quality of the object (11) by the robot (2) based on the feedback data from the sensor(s) (22). From block (313), process (300) proceeds to a logic decision (316). In logic decision (316), process (300) determines an existence of a convergence of the actual object (11) grasp quality (e.g., determined from actual robot action in an actual experiment of block (307)) and a simulated object (11) grasp quality (e.g., determined from simulated robot action in a simulated experiment of block (307)). As used herein, "convergence" means the computed grasp gets closer and closer to the ground truth object grasp location as the algorithm iterations proceed. It is opposite to "diverge", where its output will undergo larger and larger oscillations, never approaching a useful result.

If, based on the result of logic decision (316), process (300) determines there is a lack of the convergence, then process (300) proceeds to a block (319). In block (319), process (300) converts the grasp quality evaluation from block (313) into a measure of grasp success probability. Upon completion of block (319), process (300) proceeds back to block (301) and process (300) imposes the grasp success probability onto the simulator for retraining the robot (2) for grasping the object (11). In an embodiment, blocks (301), (304), (307), (310), (313) and (319), and logic decision (316) of process (300) proceed in the training ML environment (74).

For a result of logic decision (316) indicating a presence of the convergence, process (300) proceeds to a block (322) instead of proceeding to block (319). In block (322), process (300) implements run time performance of robot (2) actions for picking of object(s) (11) using at least one of the candidate grasp locations (20) determined in block (304). In an embodiment, block (322) also includes, at least in part, the above-described functionality of block (310). From block (322), process (300) proceeds a block (325). In block (325), process (300) monitors the grasp quality of the robot (2) grasping the object (11). In process (300), the monitoring in block (325) includes, at least in part, the functionality of, or process (300) proceeds to, a block (328). In block (328), process (300) implements a hybrid ML engine (51) for facilitating continuous monitoring and evaluation of object (11) grasp quality across the training (74) and run time (80) ML environments and, in applicable cases, across a plurality of robots (71). As further described herein, the monitoring and hybrid ML engine (51) implemented in block (325) and in block (328), respectively, facilitate determination of a need for retraining of robot (2) grasping object (11) based on the run time object (11) grasping performance and the grasp quality thereof. Thus, for example, in cases where, in block (325) and/or block (328), process (300) determines a need for retraining robot (2) for object (11) grasping, process (300) proceeds from block (325) and/or block (328) to block (301). In an embodiment, blocks (322), (325) and (328) of process (300) proceed in the run time ML environment (80).

Figure 5:
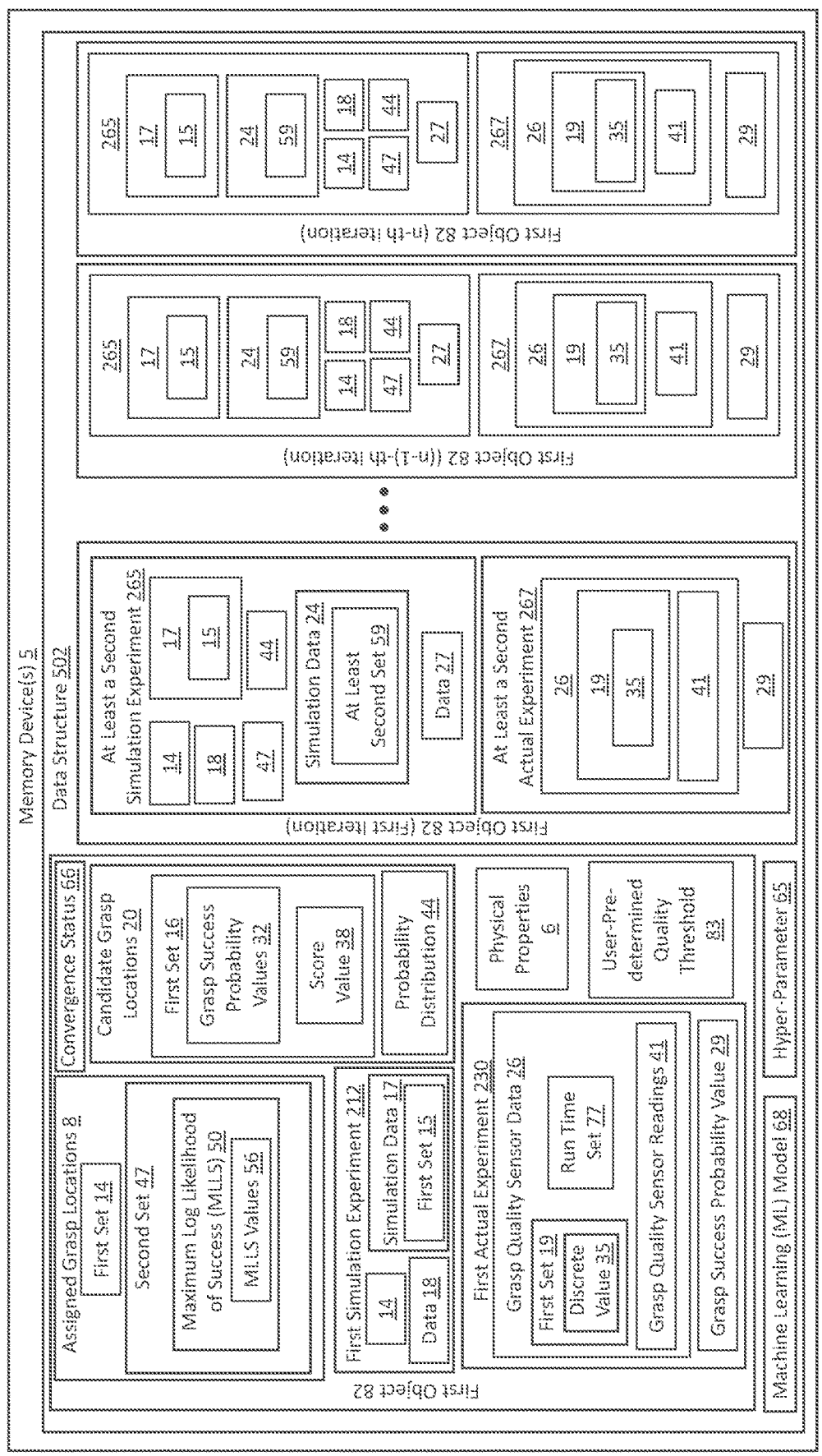
FIG. 5 is a block diagram of a data structure of the memory shown in the system of FIG. 1 according to an embodiment of the disclosure.
Figure 6:
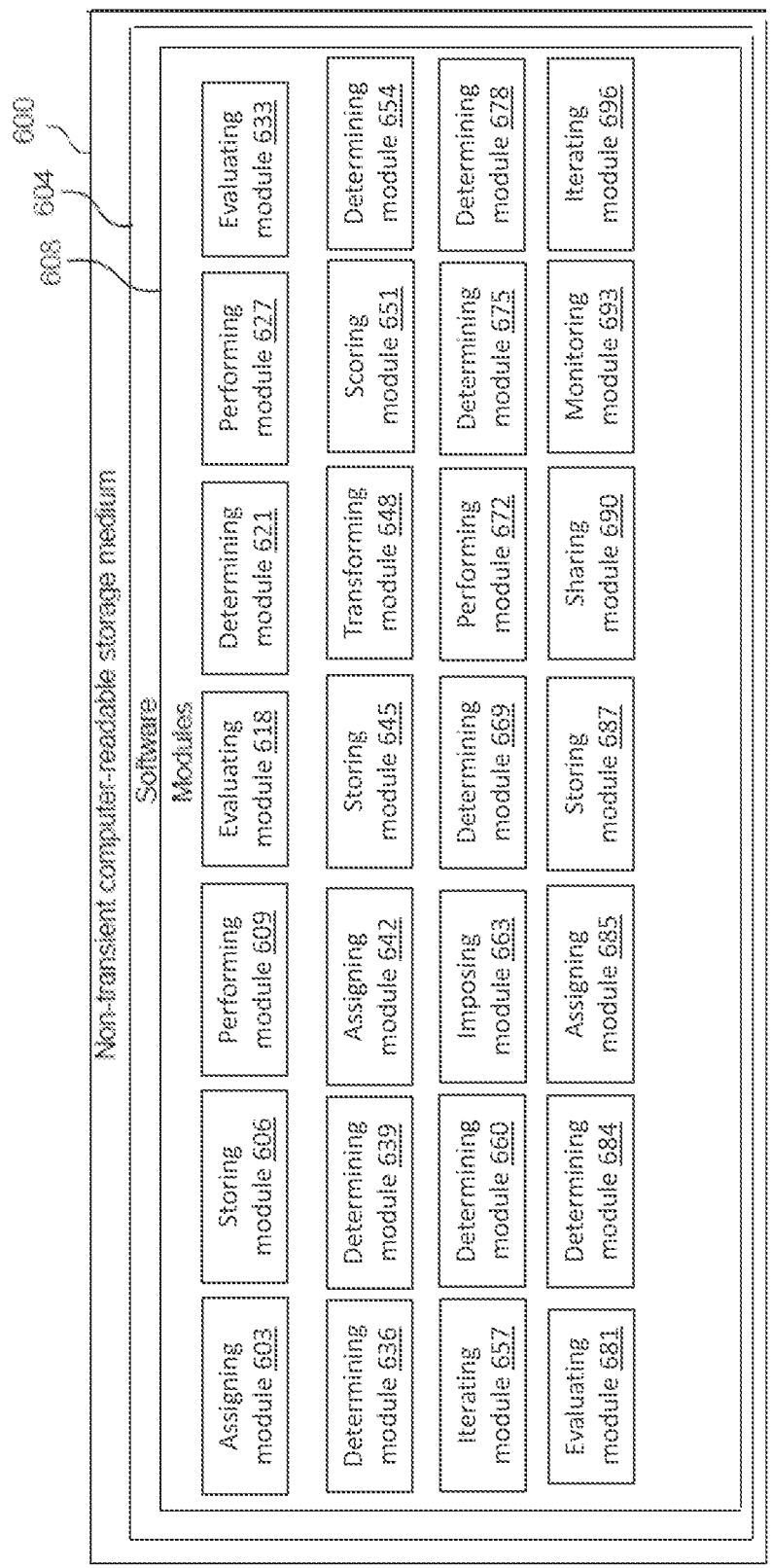
FIG. 6 is a block diagram of a software architecture for the method shown in FIG. 2 according to an embodiment of the disclosure.

FIG. 5 is a block diagram of a data structure (502) of the memory (5) of system (1) according to an embodiment of the disclosure. FIG. 6 is a block diagram of a software architecture for method (200) according to an embodiment of the disclosure. Referring to FIGS. 1-6, method (200) includes assigning (203) and storing (206), by processor(s) (3) and in memory (5), respectively, the plurality of grasp locations (8) on the object (11) based on known or estimated physical properties (6) of the object (11). In an example, the assigning (203) and/or storing (206) facilitate setting up simulation and/or actual experiment(s) for the robot (2) and the object (11) to be grasped. In an example, the plurality of grasp locations (8) on the object (11) are assigned (203) and/or stored (206) by, or at the direction of, at least one user (60) of system (1). In another example, the plurality of grasp locations (8) on the object (11) are assigned (203) and/or stored (206) by, or at the direction of, at least one administrator (48) of system (1). In yet another example, the plurality of grasp locations (8) on the object (11) are assigned (203) and/or stored (206) by, or at the direction of, processor(s) (3). In embodiments for which the assigning (203) and/or storing (206) step(s) is/are implemented and/or otherwise facilitated by software (604), processor(s) (3) execute processor (3)-executable instructions stored in an assigning (603) and/or storing (606) module(s). In an example, the plurality of grasp locations (8) on the object (11) are stored in, and read from, data structure (502) and/or elsewhere in memory (5) by, or at the direction of, processor(s) (3).

Method (200) includes performing (209), by processor(s) (3), a first simulation experiment (212) for the robot (2) grasping (215) the object (11) using a first set (14) of the plurality of assigned (203) grasp locations (8). In an example, the first simulation experiment (212) is performed (209) in the training ML environment (74). In embodiments for which the performing (209) step is implemented and/or otherwise facilitated by software (604), processor(s) (3) execute processor (3)-executable instructions stored in a performing module (609). In an example, the first set (14) of the plurality of assigned (203) grasp locations (8) is stored in, and read from, data structure (502) and/or elsewhere in memory (5) by, or at the direction of, processor(s) (3).

Method (200) includes evaluating (218), by processor(s) (3), a simulated object (11) grasp quality of the robot (2) grasping (215) for each of the first set (14) of assigned (203) grasp locations (8). In the embodiment, the simulated object (11) grasp quality is evaluated (218) based on a first set (15) of simulation data (17) from the first simulation experiment (212). The evaluating (218) step thereby facilitates adjudging grasping (215) performance by robot (2) in the first simulation experiment (212). In embodiments for which the evaluating (218) step is implemented and/or otherwise facilitated by software (604), processor(s) (3) execute processor (3)-executable instructions stored in an evaluating module (618). In an example, the first set (15) of simulation data (17) from the first simulation experiment (212) is stored in, and read from, data structure (502) and/or elsewhere in memory (5) by, or at the direction of, processor(s) (3).

Method (200) includes determining (221), by processor(s) (3), a first set (16) of candidate grasp locations (20) on the object (11). In the embodiment, the first set (16) of candidate grasp locations (20) on the object (11) are determined (221) based on data (18) representative of a simulated grasp quality obtained (224) in the evaluating (218) step. The evaluating (218) step thereby facilitates generating a list of candidate grasp locations to be used for actual experiments based on the evaluated (218) and adjudged grasping (215) performance of robot (2) in the first simulation experiment (212). The first set (16) of candidate grasp locations (20) on the object (11) is thus selected from the assigned (203) plurality of grasp locations (8) on the object (11). In embodiments for which the determining (221) step is implemented and/or otherwise facilitated by software (604), processor(s) (3) execute processor (3)-executable instructions stored in a determining module (621). In an example, the first set (16) of candidate grasp locations (20) on the object (11) is stored in, and read from, data structure (502) and/or elsewhere in memory (5) by, or at the direction of, processor(s) (3).

Method (200) may include performing (227), by processor(s) (3) and robot (2), a first actual experiment (230) for the robot (2) grasping (215) the object (11) using each of the determined (221) first set (16) of candidate grasp locations (20). In an example, the first actual experiment (230) is performed (227) in the run time ML environment (80). In embodiments for which the performing (227) step is implemented and/or otherwise facilitated by software (604), processor(s) (3) execute processor (3)-executable instructions stored in a performing module (627). It is to be understood, however, that steps of the disclosed method 2 (e.g., the performing step (227)) that are described as being performed by robot (2) in conjunction with processor (s) (3) may be performed without such close cooperation between robot (2) and processor(s) (3). For instance, processor(s) (3) performing the disclosed method (2) may receive data for processing from sensor(s) (22) that are not necessarily coupled or mounted to robot (2), but nevertheless provide (e.g., transmit) sensor (8) data to processor(s) (3) for use in the disclosed method (2). Such cases exemplify the flexibility of the disclosed systems, methods, and software in that they are beneficially applicable to a wide variety of robots, gripper devices, and sensors.

Method (200) includes evaluating (233), by processor(s) (3), an actual object (11) grasp quality of the robot (2) grasping (215) for each of the determined (221) first set (16) of candidate grasp locations (20). In the embodiment, the actual object (11) grasp quality of the robot (2) grasping (215) for each of the determined (221) first set (16) of candidate grasp locations (20) is evaluated (233) based on a first set (19) of grasp quality sensor (22) data (26) from the first actual experiment (230). The evaluating (233) step thereby facilitates adjudging grasping (215) performance by robot (2) in the first actual experiment (230). In embodiments for which the evaluating (233) step is implemented and/or otherwise facilitated by software (604), processor(s) (3) execute processor (3)-executable instructions stored in an evaluating module (633). In an example, the first set (19) of grasp quality sensor (22) data (26) from the first actual experiment (230) is stored in, and read from, data structure (502) and/or elsewhere in memory (5) by, or at the direction of, processor(s) (3).

Method (200) includes determining (236), by processor(s) (3), a convergence of the actual object (11) grasp quality and the simulated object (11) grasp quality. In the embodiment, the convergence is determined (236) based on: the first set (19) of grasp quality sensor (22) data (26) from the first actual experiment (230), and the data (18) representative of the simulated grasp quality. In an example, the determining (236) step includes determining (236) the convergence of the actual object (11) grasp quality and the simulated object (11) grasp quality for each of the determined (221) first set (16) of candidate grasp locations (20). In embodiments for which the determining (236) step is implemented and/or otherwise facilitated by software (604), processor(s) (3) execute processor (3)-executable instructions stored in a determining module (636). In an example, a determined (236) convergence status (66) is stored in, and read from, data structure (502) and/or elsewhere in memory (5) by, or at the direction of, processor(s) (3).

Figure 7:
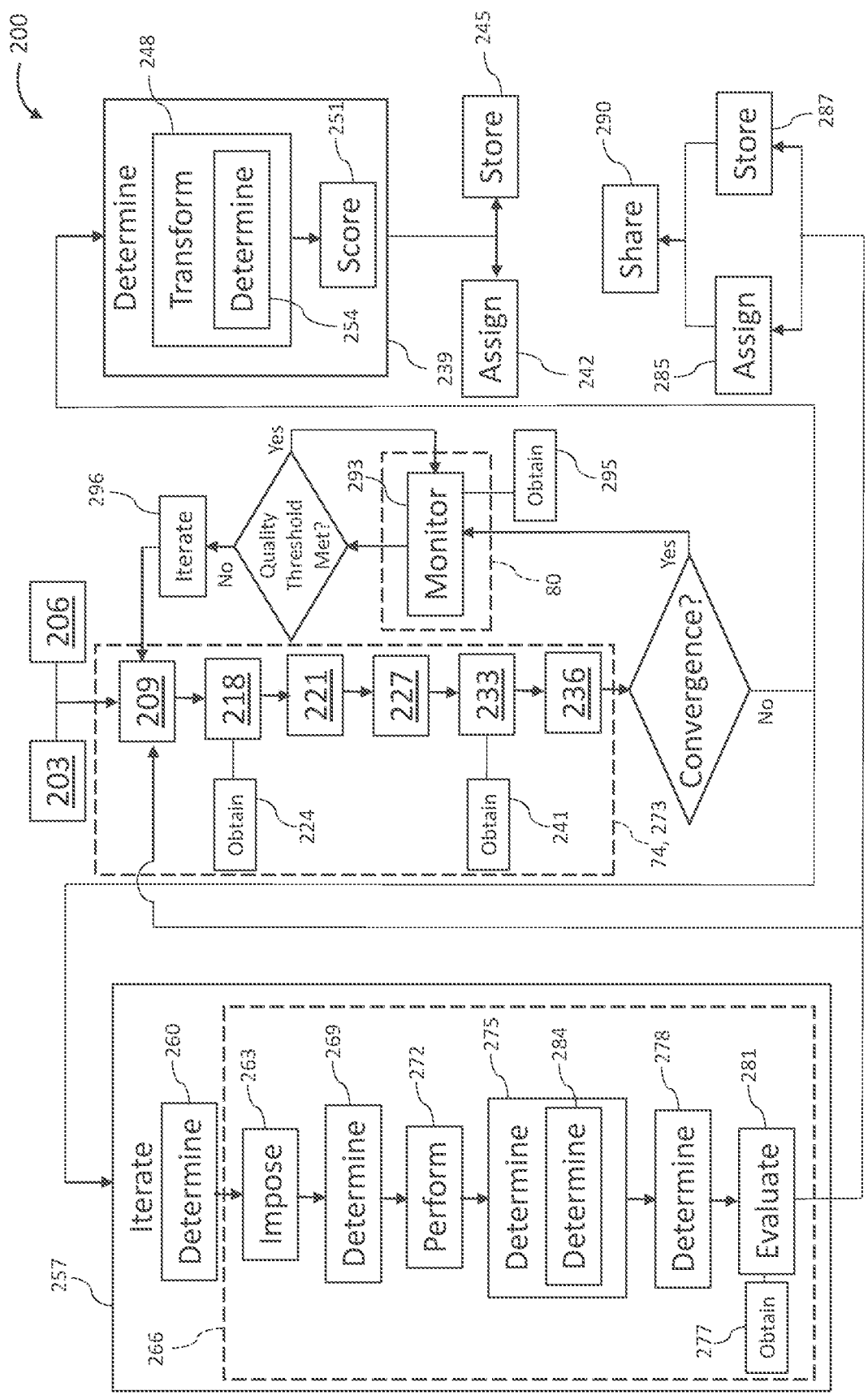
FIG. 7 is a flow chart of aspects of the method shown in FIG. 2 according to embodiments of the disclosure.

FIG. 7 is a flow chart of aspects of method (200) according to embodiments of the disclosure. Referring to FIGS. 1-7, in an embodiment, method (200) includes determining (239), by processor(s) (3), a grasp success probability value (29). In the embodiment, the grasp success probability value (29) is determined (239) for each of the determined (221) first set (16) of candidate grasp locations (20) based on the first set (19) of grasp quality sensor (22) data (26) obtained (241) in the evaluating (233) step. In an embodiment, the grasp success probability value (29) is determined (239) in response to determining (236) an absence of the convergence (e.g., a negative convergence status (66)) of the actual and the simulated object (11) grasp quality for at least one of the determined (221) first set (16) of candidate grasp locations (20). The determining (239) step thereby facilitates efficient use of computing, memory, bandwidth, and/or power resources in cases where at least one, but not all, of the determined (221) first set (16) of candidate grasp locations (20) lack convergence (e.g., do not have a positive convergence status (66)). Thus, in the embodiment, a grasp success probability value (29) is determined (239) only for those candidate grasp locations (20) lacking convergence. In embodiments for which the determining (239) step is implemented and/or otherwise facilitated by software (604), processor(s) (3) execute processor (3)-executable instructions stored in a determining module (639).

In an embodiment, method (200) includes assigning (242) and storing (245), by processor(s) (3) and in memory (5), respectively, grasp success probability values (32) respectively determined (239) for each of the determined (221) first set (16) of candidate grasp locations (20). In embodiments for which the assigning (242) and/or storing (245) step(s) is/are implemented and/or otherwise facilitated by software (604), processor(s) (3) execute processor (3)-executable instructions stored in assigning (642) and/or storing (645) module(s). In an example, determined (239) grasp success probability value(s) (29) and/or grasp success probability values (32) is/are stored in, and read from, data structure (502) and/or elsewhere in memory (5) by, or at the direction of, processor(s) (3).

In an embodiment, the determining (239) step of method (200) includes transforming (248), by processor(s) (3), each of the first set (19) of grasp quality sensor (22) data (26) into a discrete value (35). In embodiments for which the transforming (248) step is implemented and/or otherwise facilitated by software (604), processor(s) (3) execute processor (3)-executable instructions stored in a transforming module (648). In an example, discrete value(s) (35) resulting from the transforming (248) step is/are stored in, and read from, data structure (502) and/or elsewhere in memory (5) by, or at the direction of, processor(s) (3). In the embodiment, the determining (239) step includes scoring (251), by processor (s) (3), each of the determined (221) first set (16) of candidate grasp locations (20) based on respective transformed (248) discrete values (35). In the embodiment, a score value (38) for each of the determined (221) first set (16) of candidate grasp locations (20) is proportional to the determined (239) grasp success probability value (29). In embodiments for which the scoring (251) step is implemented and/or otherwise facilitated by software (604), processor(s) (3) execute processor (3)-executable instructions stored in a scoring module (651). In an example, score value(s) (38) resulting from the scoring (251) step is/are stored in, and read from, data structure (502) and/or elsewhere in memory (5) by, or at the direction of, processor(s) (3).

In an embodiment, the transforming (248) step of method (200) includes determining (254) the discrete value (35) based on a plurality of grasp quality sensor (22) readings (41) for each of the determined (221) first set (16) of candidate grasp locations (20). In embodiments for which the determining (254) step is implemented and/or otherwise facilitated by software (604), processor(s) (3) execute processor (3)-executable instructions stored in a determining module (654). In an example, the plurality of grasp quality sensor (22) readings (41) used for determining (254) the discrete value are stored in, and read from, data structure (502) and/or elsewhere in memory (5) by, or at the direction of, processor(s) (3).

In an embodiment, method (200) includes iterating (257), by processor(s) (3) and robot(s) (2), though the performing (209), evaluating (218), determining (221), performing (227), evaluating (233), and determining (236) steps for the at least one candidate grasp location (20). In the embodiment, the iterating (257) step is performing in method (200) for at least one iteration (266). In an example, the iterating (257) step is performed in response to determining (236) the absence of the convergence (e.g., negative convergence status (66)) of the actual and the simulated object (11) grasp quality for the at least one determined (221) first set (16) of candidate grasp locations (20). The iterating (257) step thereby facilitates efficient use of computing, memory, bandwidth, and/or power resources in cases where at least one of the determined (221) first set (16) of candidate grasp locations (20) lack convergence (e.g., do not have a positive convergence status (66)). Thus, in the embodiment, the performing (209), evaluating (218), determining (221), performing (227), evaluating (233), and determining (236) steps are iterated (257) through only for those candidate grasp locations (20) lacking convergence. The iterating (257) step thus directs method (200) back to the simulation (e.g., at least a second simulation experiment (265)) and/or actual (e.g., at least a second actual experiment (267)) experiments for retraining robot (2) grasping (215) for the at least one candidate grasp location (20), which ensures that the ML model (68) maintains accurate data for respective candidate grasp locations (20) for the object (11). In embodiments for which the iterating (257) step is implemented and/or otherwise facilitated by software (604), processor(s) (3) execute processor (3)-executable instructions stored in an iterating module (657).

In an embodiment, the iterating (257) step of method (200) includes, for the at least one iteration (266), determining (260), by processor(s) (3), a grasp success probability distribution (44) for the determined (221) first set (16) of candidate grasp locations (20). In the embodiment, the grasp success probability distribution (44) is determined (260) based on the determined (239) grasp success probability values (29). In the embodiment, the iterating (257) step includes, for the at least one iteration (266), imposing (263), by processor(s) (3), the determined (260) grasp success probability distribution (44) on at least one second simulation experiment (265) for the robot(s) (2) grasping (215) the object (11) using the determined (221) first set (16) of candidate grasp locations (20). The determining (260) and imposing (263) steps thus facilitate retraining robot (2) grasping (215) of the object (11) for the at least one candidate grasp location (20) by incorporating the grasp success probability distribution (44) into the ML model (68), which increases its accuracy and robustness. In embodiments for which the determining (260) and/or imposing (263) step(s) is/are implemented and/or otherwise facilitated by software (604), processor(s) (3) execute processor (3)-executable instructions stored in determining (660) and/or imposing (663) module(s). In an example, the determined (260) and imposed (263) grasp success probability distribution (44) is stored in, and read from, data structure (502) and/or elsewhere in memory (5) by, or at the direction of, processor(s) (3).

In an embodiment, the iterating (257) step of method (200) includes, for the at least one iteration (266), determining (269), by processor(s) (3), at least a second set (47) of the plurality of assigned (203) grasp locations (8). In the embodiment, the at least a second set (47) of the plurality of assigned (203) grasp locations (8) is determined (269) based on the grasp success probability distribution (44) imposed (263) on the at least a second simulation experiment (265). In an example, the at least a second set (47) differs from the first set (14) by the addition or removal of at least assigned (203) grasp location (8) on the object (11). In the embodiment, the iterating (257) step includes, for the at least one iteration (266), performing (272), by processor(s) (3), the at least a second simulation experiment (265) using the at least a second set (47) of assigned (203) grasp locations (8). The determining (269) and performing (272) steps thus facilitate retraining robot (2) grasping (215) of the object (11) by performing subsequent simulation and actual experiments using the at least a second set (47) of the plurality of assigned (203) grasp locations (8) determined (269) based on the imposed (263) grasp success probability distribution (44), which refines the assigned (203) grasp locations (8) and further increases the accuracy and robustness of the ML model (68). In embodiments for which the determining (269) and/or performing (272) step(s) is/are implemented and/or otherwise facilitated by software (604), processor(s) (3) execute processor (3)-executable instructions stored in determining (669) and/or performing (672) module(s). In an example, the determined (269) at least a second set (47) of the plurality of assigned (203) grasp locations (8) is stored in, and read from, data structure (502) and/or elsewhere in memory (5) by, or at the direction of, processor(s) (3).

In an embodiment, the iterating (257) step of method (200) includes, for the at least one iteration (266), determining (275), by processor(s) (3), a maximum log likelihood of success (MLLS) (50) for each of the at least a second set (47) of assigned (203) grasp locations (8). In the embodiment, the MLLS (50) is determined (275) based on the determined (260) grasp success probability distribution (44). In the embodiment, the iterating (257) step includes, for the at least one iteration (266), determining (278), by processor(s) (3), at least a second set (53) of candidate grasp locations (20). In the embodiment, the at least a second set (53) of candidate grasp locations (20) are determined (278) based on respectively determined (275) MLLS values (56) for each of the at least a second set (47) of assigned (203) grasp locations (8). In an example, the at least a second set (53) differs from the first set (16) by the addition or removal of at least one candidate grasp location (20). The determining (275 and 278) steps thus facilitate retraining robot (2) grasping (215) of the object (11) by performing subsequent simulation and actual experiments using the at least a second set (53) of the candidate grasp locations (20) determined (278) based on the respectively determined (275) MLLS values (56), which refines the candidate grasp locations (20) and further increases the accuracy and robustness of the ML model (68). In embodiments for which the determining (275 and/or 278) step(s) is/are implemented and/or otherwise facilitated by software (604), processor(s) (3) execute processor (3)-executable instructions stored in determining module(s) (675 and/or 678). In an example, the determined (275) MLLS (50) and/or the determined (278) MLLS values (56) is/are stored in, and read from, data structure (502) and/or elsewhere in memory (5) by, or at the direction of, processor(s) (3).

In an embodiment, the iterating (257) step of method (200) includes, for the at least one iteration (266), evaluating (281), by processor(s) (3), a simulated grasp quality of the robot (2) grasping (215) for each of the at least a second set (47) of assigned (203) grasp locations (8) on the object (11). In the embodiment, the simulated grasp quality of the robot (2) grasping (215) for each of the at least a second set (47) of assigned (203) grasp locations (8) is evaluated (281) based on at least a second set (59) of simulation data (24) from the at least a second simulation experiment (265). In the embodiment, the determining (275) step of method (200) includes determining (284) the MLLS (50) further based on data (27) representative of the simulated grasp quality obtained (277) by processor(s) (3) in the evaluating (281) step from the at least a second set (59) of simulation data (24) from the at least a second simulation experiment (265). In embodiments for which the evaluating (281) and/or determining (284) step(s) is/are implemented and/or otherwise facilitated by software (604), processor(s) (3) execute processor (3)-executable instructions stored in evaluating (681) and/or determining (684) module(s). In an example, the at least a second set (59) of simulation data (24) from the at least a second simulation experiment (265) and/or the data (27) representative of the simulated grasp quality obtained (277) by processor(s) (3) in the evaluating (281) step is/are stored in, and read from, data structure (502) and/or elsewhere in memory (5) by, or at the direction of, processor(s) (3).

In an embodiment, method (200) includes assigning (285) and storing (287), by processor(s) (3) and in memory (5), respectively, a hyper-parameter (65) of the ML model (68). As used herein, "hyper-parameter" means one or more settings that can be tuned to control the behavior of a machine learning algorithm. The hyper-parameter (65) is representative of a simulated grasp quality for the at least a second simulation experiment (265) for the robot(s) (2) grasping (215) the object (11). In embodiments for which system (1) includes a plurality of object picking robots (71) (e.g., a first robot (2) and at least a second robot (2)), the method (200) further includes sharing (290) the hyper-parameter (65) assigned (285) to a first robot (2) with the at least a second robot (2). The assigning (285) and sharing (290) steps thereby facilitate efficient use of computing, memory, bandwidth, and/or power resources in cases where a plurality of robots (71) are utilized in the run time ML (80) and/or training ML (74) environments. Thus, in the embodiment, only one robot (2) (e.g., the first robot (2)) of the plurality of robots (71) needs to be trained and/or retrained and the ML model (68) developed for it according to the disclosed method (200). As such, additional robot(s) (2) (e.g., the at least a second robot (2) having the same or similar design specifications and/or meeting the same or similar functional requirements as the first robot (2)) may not need to be trained and/or retrained for grasping (215) the object (11). In embodiments for which the assigning (285), storing (287), and/or sharing (290) step(s) is/are implemented and/or otherwise facilitated by software (604), processor(s) (3) execute processor (3)-executable instructions stored in assigning (685), storing (687), and/or sharing (690) module(s). In an example, the hyper-parameter (65) assigned (285) to the ML model (68) is stored (287) in, and read from, data structure (502) and/or elsewhere in memory (5) by, or at the direction of, processor(s) (3).

In an embodiment, the performing (209), evaluating (218), determining (221), performing (227), evaluating (233), and determining (236) steps of method (200) are performed in the ML training environment (74). In the embodiment, method (200) includes monitoring (293), by processor(s) (3), a run time grasp quality of the robot(s) (2) grasping (215) object (11) using the at least one candidate grasp location (20). In the embodiment, the run time grasp quality of the robot(s) (2) grasping (215) object (11) using the at least one candidate grasp location (20) is monitored (293) based on a run time set (77) of grasp quality sensor (22) data (26) obtained (295) from the robot(s) (2) grasping (215) the object (11) in the ML run time (e.g., actual, "real world") environment (80). In the embodiment, the monitoring (293) step is performed in response to determining (236) a presence of the convergence (e.g., positive convergence status (66)) of the actual and the simulated object (11) grasp quality for at least one of the determined (221) first set (16) of candidate grasp locations (20). The monitoring (293) step thereby facilitates efficient use of computing, memory, bandwidth, and/or power resources in cases where at least one of the determined (221) first set (16) of candidate grasp locations (20) have convergence (e.g., do not have a negative convergence status (66)). Thus, in the embodiment, only those candidate grasp locations (20) having the convergence proceed to, and are monitored (293) in, the run time ML environment (80), which helps ensure the ML model (68) is maintained with accurate and up-to-date data for use in both the run time ML (80) and the training ML (74) environments. In embodiments for which the monitoring (293) step is implemented and/or otherwise facilitated by software (604), processor(s) (3) execute processor (3)-executable instructions stored in a monitoring (693) module. In an example, the run time set (77) of grasp quality sensor (22) data (26) is stored (287) in, and read from, data structure (502) and/or elsewhere in memory (5) by, or at the direction of, processor(s) (3).

In an embodiment, the method (200) includes iterating (296), by processor(s) (3) and robot(s) (2), though the performing (209), evaluating (218), determining (221), performing (227), evaluating (233), and determining (236) steps for the at least one candidate grasp location (20). In the embodiment, the iterating (296) step is performing in method (200) for at least one iteration (273). In an example, the iterating (296) step is performed in response to the monitored (293) run time grasp quality decreasing below or otherwise not meeting a user (60)-predetermined quality threshold (83). In an example, the user-(60) predetermined quality threshold (83) is an occurrence (e.g., as sensed by camera sensor(s) (22)) of the object (11) falling out of the gripper (30). In another example, the user-(60) predetermined quality threshold (83) is an occurrence (e.g., as sensed by multi-degree of freedom (DOF) force-torque, multi-DOF inertial measurement, and/or tactile sensor(s) (22)) of the object (11) exhibiting wobble and/or vibration when being grasped (215) by and/or carried in the gripper (30), where such wobble and/or vibration undesirably exceeds levels normally observed during operation of robot (2). In yet another example, the user-(60) predetermined quality threshold (83) is an occurrence (e.g., as sensed by sensor(s) (22)) of the object (11) exhibiting relative motion and/or physical dynamics with respect to and/or as compared to the gripper (30) which is out of tolerance as compared to an expected or user (60)-specified amount of relative motion.

In the embodiment, the iterating (296) step thereby facilitates efficient use of computing, memory, bandwidth, and/or power resources in cases where, based on the monitored (293) run time grasp quality, optimization of the ML model (68) is needed to ensure consistent object (11) grasping (215) performance during run time. The monitoring (293) and iterating (296) steps, along with one or more of the above-described steps of method (200), together constitute a hybrid ML engine (51) facilitating continuous monitoring and evaluation of object (11) grasp quality across the training (74) and run time (80) ML environments and, in applicable cases, across a plurality of robots (71). Furthermore, in a use case, monitored (293) run time grasp quality for at least one robot (2) may not meet user (60)-predetermined quality threshold (83) due to a mechanical problem with that robot (2). In this use case, the mechanical problem may be identified and rectified so that normal unit operations may be resumed following retraining of the respective robot (2) as needed, including via the iterating (296) step of method (200). In embodiments for which the iterating (296) step is implemented and/or otherwise facilitated by software (604), processor(s) (3) execute processor (3)-executable instructions stored in an iterating (696) module. In an example, the user (60)-predetermined quality threshold (83) is stored (287) in, and read from, data structure (502) and/or elsewhere in memory (5) by, or at the direction of, processor(s) (3).

Using the disclosed systems and methods for hybrid ML-based training of object picking robots with real and simulated grasp performance data provides users a number of beneficial technical effects and realizes various advantages as compared to known systems and methods. Such benefits include, without limitation, enabling picking and placing of object(s) with enhanced accuracy, speed, efficiency, and reduced error rates as compared to known processes. Utilizing the disclosed systems and methods for hybrid ML-based training of object picking robots thereby results in a reduction in the required number of per object CPU clock cycles needed for processor(s) in both training and run time environments, as compared to known systems and methods. The above-described hybrid ML-based training of object picking robots enable continuous evaluation and monitoring of object grasping performance so that the hybrid ML operations may be implemented for fine-tuning and enhancing the accuracy and robustness of ML models as needed, including across numerous robots involved in unit operations. As such, the disclosed systems and methods for hybrid machine learning-based training of object picking robots enable efficient and effective training of object picking robots in a wide variety of industrial applications where improved utilization of computing, memory, network bandwidth, electric power, and/or human personnel resources is desirable.

These and other substantial and numerous technical benefits and beneficial effects appreciable to persons of ordinary skill in the art are especially evident as compared to known systems and methods in applications involving high volume and high tempo industrial operations. These improvements over known systems and methods are not accomplished by merely utilizing conventional and routine processing systems and methods. Even in cases where such improvements may be quantified in terms of per object time reductions (e.g., measured as seconds, or fractions thereof), over relevant time periods (e.g., from hours to years) and as compared to known processes, the disclosed systems and methods for hybrid machine learning-based training of object picking robots with real and simulated grasp performance data utilize computing, network, memory, electric power, personnel, among other, resources at significantly greater efficiencies to provide improved throughput of, and overall cost reduction for, a variety of industrial unit operations involving robotic picking and placement of objects.

Various embodiments disclosed herein are to be taken in the illustrative and explanatory sense, and should in no way be construed as limiting of the present disclosure.

While aspects of the present disclosure have been particularly shown and described with reference to the embodiments above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

We claim:

1. A method for training an object picking robot with real and simulated grasp performance data, comprising:
   (a) assigning, by a processor, a plurality of grasp locations on an object based on known or estimated physical properties of the object;
   (b) performing, by the processor, a first simulation experiment for the robot grasping the object using a first set of the plurality of assigned grasp locations;
   (c) evaluating, by the processor and based on a first set of simulation data from the first simulation experiment, a simulated object grasp quality of the robot grasping for each of the first set of assigned grasp locations;
   (d) determining, by the processor, a first set of candidate grasp locations on the object based on data representative of a simulated grasp quality obtained in (c);
   (e) evaluating, by the processor and based on a first set of grasp quality sensor data from a first actual experiment for the robot grasping the object using each of the first set of candidate grasp locations, an actual object grasp quality of the robot grasping for the each of the first set of candidate grasp locations; and
   (f) for the each of the first set of candidate grasp locations, determining, by the processor, a convergence of the actual object grasp quality and the simulated object grasp quality based on: the first set of grasp quality sensor data from the first actual experiment, and the data representative of the simulated grasp quality.

2. The method of claim 1, further comprising:
   (g) in response to determining, in (f), an absence of the convergence of the actual and the simulated object grasp quality for at least one of the first set of candidate grasp locations, determining, by the processor, a grasp success probability value for the each of the first set of candidate grasp locations based on the first set of grasp quality sensor data obtained in (e).

3. The method of claim 2, further comprising:
   (h) assigning, by the processor, grasp success probability values respectively determined in (g) for the each of the first set of candidate grasp locations.

4. The method of claim 2, wherein determining the grasp success probability value includes:
   (I) transforming, by the processor, each of the first set of grasp quality sensor data into a discrete value; and
   (II) scoring, by the processor, the each of the first set of candidate grasp locations based on respective discrete values from (I), wherein a score value for the each of the first set of candidate grasp locations is proportional to the grasp success probability value determined in (g).

5. The method of claim 4, wherein the transforming includes determining the discrete value based on a plurality of grasp quality sensor readings for the each of the first set of candidate grasp locations.

6. The method of claim 1, wherein (b)-(f) are performed in a machine learning training environment, and wherein the method further comprises:
   (g) in response to determining, in (f), a presence of the convergence of the actual and the simulated object grasp quality for at least one of the first set of candidate grasp locations, monitoring, by the processor, a run time grasp quality of the robot grasping using the at least one candidate grasp location based on a run time set of grasp quality sensor data obtained from the robot grasping in a machine learning run time computing environment.

7. The method of claim 6, further comprising:
(h) in response to the run time grasp quality monitored in (g) decreasing below or otherwise not meeting a user-predetermined quality threshold, iterating, by the processor, and for at least one iteration, through (b)-(f) for the at least one candidate grasp location.

8. A system for training an object picking robot with real and simulated grasp performance data, comprising:
one or more memory devices; and one or more processors in communication with the one or more memory devices and the object picking robot, wherein the one or more processors are programmed to:
(a) assign a plurality of grasp locations on an object based on known or estimated physical properties of the object;
(b) perform a first simulation experiment for the robot grasping the object using a first set of the plurality of assigned grasp locations;
(c) evaluate, based on a first set of simulation data from the first simulation experiment, a simulated object grasp quality of the robot grasping for each of the first set of assigned grasp locations;
(d) determine a first set of candidate grasp locations on the object based on data representative of a simulated grasp quality obtained in (c);
(e) evaluate, based on a first set of sensor data from a first actual experiment for the robot grasping the object using each of the first set of candidate grasp locations, an actual object grasp quality of the robot grasping for the each of the first set of candidate grasp locations; and
(f) for the each of the first set of candidate grasp locations, determine a convergence of the actual object grasp quality and the simulated object grasp quality based on: the first set of grasp quality sensor data from the first actual experiment, and the data representative of the simulated grasp quality.

9. The system of claim 8, wherein the one or more processors are further programmed to:
(g) in response to determining, in (f), an absence of the convergence of the actual and the simulated object grasp quality for at least one of the first set of candidate grasp locations, determine a grasp success probability value for the each of the first set of candidate grasp locations based on the first set of sensor data obtained in (e).

10. The system of claim 9, wherein the one or more processors are further programmed to:
(h) further in response to determining, in (f), the absence of the convergence of the actual and the simulated object grasp quality for the at least one of the first set of candidate grasp locations, iterate, for at least one iteration, through (b)-(f) for the at least one candidate grasp location.

11. The system of claim 10, wherein, for iterating through (b)-(f) for the at least one candidate grasp location for the at least one iteration, the one or more processors are further programmed to:
(I) determine a grasp success probability distribution for the first set of candidate grasp locations based on grasp success probability values determined in (g); and
(II) impose the grasp success probability distribution determined in (I) on the first set of candidate grasp locations to prepare at least a second simulation experiment for the robot grasping the object.

12. The system of claim 11, wherein, for iterating through (b)-(f) for the at least one candidate grasp location for the at least one iteration, the one or more processors are further programmed to:
(III) determine at least a second set of the plurality of assigned grasp locations based on the grasp success probability distribution imposed in (II) on the at least a second simulation experiment; and
(IV) perform the at least a second simulation experiment using the at least a second set of assigned grasp locations.

13. The system of claim 12, wherein for iterating through (b)-(f) for the at least one candidate grasp location for the at least one iteration, the one or more processors are further programmed to:
(V) determine a maximum log likelihood of success for each of the at least a second set of assigned grasp locations based on the grasp success probability distribution determined in (I), the maximum log likelihood of success including maximum log likelihood of success valves indicative of likely success of the at least a second set of assigned grasp locations; and
(VI) determine at least a second set of candidate grasp locations based on maximum log likelihood of success values respectively determined in (V) for the each of the at least a second set of assigned grasp locations.

14. The system of claim 13, wherein for iterating through (b)-(f) for the at least one candidate grasp location for the at least one iteration, the one or more processors are further programmed to:
(VII) evaluate, based on at least a second set of simulation data from the at least a second simulation experiment, a simulated grasp quality of the robot grasping for the each of the at least a second set of assigned grasp locations on the object.

15. The system of claim 14, wherein, for determining the maximum log likelihood of success, the one or more processors are further programmed to: determine the maximum log likelihood of success further based on data representative of the simulated grasp quality obtained in (VII).

16. The system of claim 10, wherein the one or more processors are further programmed to:
(i) assign a hyper-parameter representative of a simulated grasp quality for at least a second simulation experiment for the robot grasping the object for tuning the machine learning model.

17. The system of claim 16, wherein, for training a plurality of object picking robots including a first robot and at least a second robot, the one or more processors are further programmed to:
(j) share the hyper-model parameter assigned in (i) to a first robot with at least a second robot.

18. A non-transitory computer-readable storage medium storing processor-executable instructions for training an object picking robot with real and simulated grasp performance data, wherein, when executed by one or more processors, the processor-executable instructions cause the one or more processors to:
(a) assign a plurality of grasp locations on an object based on known or estimated physical properties of the object;
(b) perform a first simulation experiment for the robot grasping the object using a first set of the plurality of assigned grasp locations;
(c) evaluate, based on a first set of simulation data from the first simulation experiment, a simulated object grasp quality of the robot grasping for each of the first set of assigned grasp locations;

(d) determine a first set of candidate grasp locations on the object based on data representative of a simulated grasp quality obtained in (c); and (e) evaluate, based on a first set of grasp quality sensor data from a first actual experiment for the robot grasping the object using each of the first set of candidate grasp locations, an actual object grasp quality of the robot grasping for the each of the first set of candidate grasp locations, and (f) for the each of the first set of candidate grasp locations, determine a convergence of the actual object grasp quality and the simulated object grasp quality based on: the first set of grasp quality sensor data from the first actual experiment, and the data representative of the simulated grasp quality.

19. The non-transitory computer-readable storage medium of claim 18, wherein, when executed by the one or more processors, the processor-executable instructions further cause the one or more processors to:

(g) in response to determining, in (f), an absence of the convergence of the actual and the simulated object grasp quality for at least one of the first set of candidate grasp locations, determine a grasp success probability value for the each of the first set of candidate grasp locations based on the first set of grasp quality sensor data obtained in (e); and (h) assign grasp success probability values respectively determined in (g) for the each of the first set of candidate grasp locations.

* * * * *